(12) United States Patent
Killian

(10) Patent No.: US 12,190,041 B2
(45) Date of Patent: Jan. 7, 2025

(54) PORTAL AND INTERFACE SYSTEM AND METHOD

(71) Applicant: Jobby Inc., Irvine, CA (US)

(72) Inventor: Travis Michael Killian, Whittier, CA (US)

( * ) Notice: Subject to any disclaimer, the term of this patent is extended or adjusted under 35 U.S.C. 154(b) by 0 days.

(21) Appl. No.: 17/821,070

(22) Filed: Aug. 19, 2022

(65) Prior Publication Data

US 2023/0059021 A1 Feb. 23, 2023

Related U.S. Application Data

(60) Provisional application No. 63/235,829, filed on Aug. 23, 2021, provisional application No. 63/235,845, filed on Aug. 23, 2021, provisional application No. 63/235,839, filed on Aug. 23, 2021.

(51) Int. Cl.
*G06F 40/106* (2020.01)
*G06F 9/451* (2018.01)
*G06F 40/14* (2020.01)
*G06Q 10/1053* (2023.01)

(52) U.S. Cl.
CPC ............ *G06F 40/106* (2020.01); *G06F 9/451* (2018.02); *G06F 40/14* (2020.01); *G06Q 10/1053* (2013.01)

(58) Field of Classification Search
CPC ........ G06F 40/106; G06F 40/14; G06F 9/451; G06Q 10/1053
See application file for complete search history.

(56) References Cited

U.S. PATENT DOCUMENTS

| | | | | |
|---|---|---|---|---|
| 5,796,401 A | * | 8/1998 | Winer | G06T 11/60 345/619 |
| 5,838,317 A | * | 11/1998 | Bolnick | G06F 3/013 715/764 |
| 7,657,830 B2 | * | 2/2010 | Ovetchkine | G06F 9/451 715/212 |

(Continued)

FOREIGN PATENT DOCUMENTS

| | | | | |
|---|---|---|---|---|
| CA | 2756537 A1 | * | 10/2012 | ........... G06F 9/4443 |
| WO | WO-0177822 A2 | * | 10/2001 | ........... G06F 9/4443 |

(Continued)

OTHER PUBLICATIONS

International Search Report and Written Opinion, issued on PCT Patent Application No. PCT/US2022/075268, dated Nov. 8, 2022.

*Primary Examiner* — Shahid K Khan
(74) *Attorney, Agent, or Firm* — McCarter & English, LLP; James M. Smedley; Alex Korona

(57) ABSTRACT

A system is disclosed. The system has one or more user devices each configured to display a graphical user interface, an update module configured to communicate with the one or more user devices, the update module comprising computer-executable code stored in non-volatile memory, and a processor. The one or more user devices, the update module, and the processor are configured to display the graphical user interface to a user, the graphical user interface displaying a plurality of blocks of content describing the user, receive a content update from the user, associate the content update with at least one of the plurality of blocks of content, and move the at least one of the plurality of blocks to an update position of the graphical user interface.

7 Claims, 10 Drawing Sheets

(56) References Cited

U.S. PATENT DOCUMENTS

| | | | |
|---|---|---|---|
| 7,847,755 B1* | 12/2010 | Hardebeck | G06F 9/452 709/236 |
| 8,091,021 B2* | 1/2012 | Bargeron | G06F 40/186 715/252 |
| 10,417,299 B1* | 9/2019 | Terleski | G06F 16/9577 |
| 2003/0020671 A1* | 1/2003 | Santoro | G09G 5/14 345/1.3 |
| 2005/0044506 A1* | 2/2005 | Makela | G06F 16/9577 715/788 |
| 2006/0010392 A1* | 1/2006 | Noel | H04L 65/403 715/759 |
| 2006/0026069 A1* | 2/2006 | Mazurkiewicz | G06Q 30/02 705/14.42 |
| 2006/0074909 A1* | 4/2006 | Fredericks | G06Q 50/10 |
| 2007/0203776 A1* | 8/2007 | Austin | G06Q 10/1053 705/321 |
| 2009/0070126 A1* | 3/2009 | MacDaniel | G06Q 10/1053 705/321 |
| 2010/0070875 A1* | 3/2010 | Turski | G06Q 10/107 707/E17.032 |
| 2010/0199180 A1* | 8/2010 | Brichter | G06F 3/0482 715/702 |
| 2010/0223572 A1 | 9/2010 | Upadhyaya | |
| 2011/0082807 A1* | 4/2011 | Parekh | G06Q 50/01 705/319 |
| 2012/0083260 A1* | 4/2012 | Arriola | G06F 16/252 455/418 |
| 2012/0117556 A1* | 5/2012 | Hungerford | G06F 3/048 717/171 |
| 2012/0162266 A1* | 6/2012 | Douglas | G06T 11/60 345/677 |
| 2012/0284648 A1* | 11/2012 | Marshall | G06Q 50/01 715/753 |
| 2013/0055055 A1* | 2/2013 | Turcotte | G06F 40/106 715/201 |
| 2013/0080968 A1* | 3/2013 | Hanson | G06F 9/451 715/783 |
| 2013/0283152 A1* | 10/2013 | Venkata | G06F 40/103 715/244 |
| 2014/0129460 A1* | 5/2014 | Budzienski | G06Q 10/1053 705/321 |
| 2014/0129910 A1* | 5/2014 | Kota | G06F 40/103 715/202 |
| 2014/0150080 A1* | 5/2014 | Miller | H04L 63/062 726/9 |
| 2014/0164938 A1* | 6/2014 | Petterson | G06F 3/048 715/739 |
| 2014/0282099 A1* | 9/2014 | Bronder | H04L 65/612 715/753 |
| 2015/0089355 A1* | 3/2015 | Peng | G06F 40/106 715/244 |
| 2015/0289100 A1* | 10/2015 | Stringer, II | H04W 4/021 455/456.3 |
| 2015/0309698 A1* | 10/2015 | Senderek | G06F 3/04883 715/815 |
| 2016/0041698 A1* | 2/2016 | Tkach | G06F 3/0482 715/765 |
| 2016/0063442 A1* | 3/2016 | Bennett | G06Q 10/1053 705/319 |
| 2016/0189248 A1* | 6/2016 | Boyle | G06F 40/143 705/14.73 |
| 2017/0003851 A1 | 1/2017 | Moore et al. | |
| 2017/0076225 A1* | 3/2017 | Zhang | G06Q 10/063 |
| 2017/0293414 A1* | 10/2017 | Pierce | G06F 3/0482 |
| 2018/0239499 A1* | 8/2018 | Santoro | G06F 16/955 |
| 2018/0285337 A1* | 10/2018 | Wagh | G06F 3/0485 |
| 2019/0129973 A1* | 5/2019 | Truong | G06F 16/93 |
| 2019/0324825 A1* | 10/2019 | Schwartz | G06F 3/04842 |
| 2021/0096714 A1* | 4/2021 | Corsin | G06F 3/04883 |

FOREIGN PATENT DOCUMENTS

| | | | | |
|---|---|---|---|---|
| WO | WO-2010135746 A1 * | 11/2010 | | G06Q 10/107 |
| WO | WO-2013036250 A1 * | 3/2013 | | G06F 16/156 |
| WO | WO-2013044194 A2 * | 3/2013 | | G06F 16/4393 |
| WO | WO-2013180977 A1 * | 12/2013 | | G06F 9/451 |
| WO | WO-2014093663 A1 * | 6/2014 | | G06F 3/048 |

\* cited by examiner

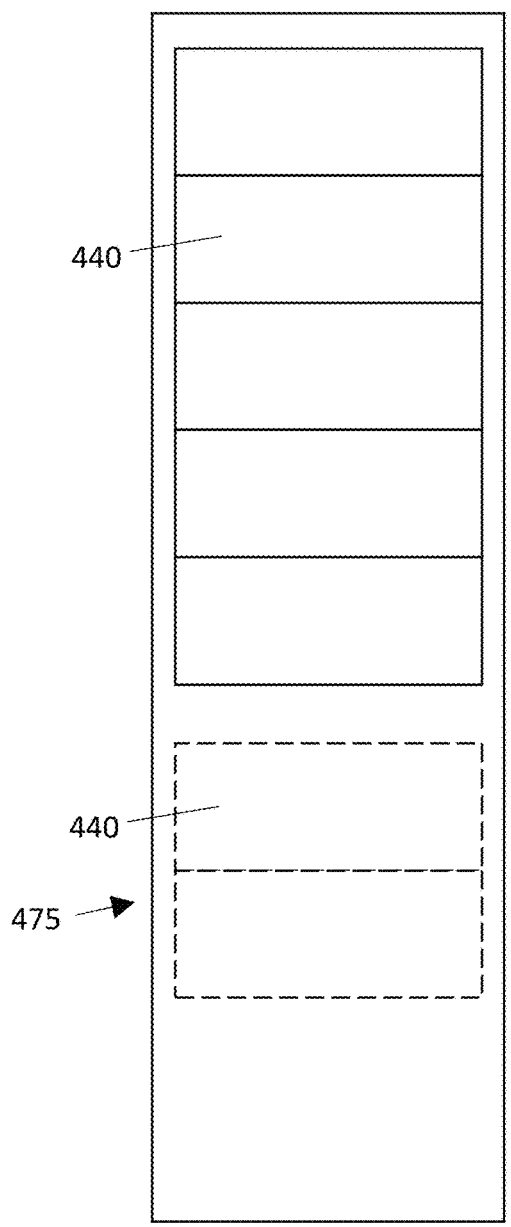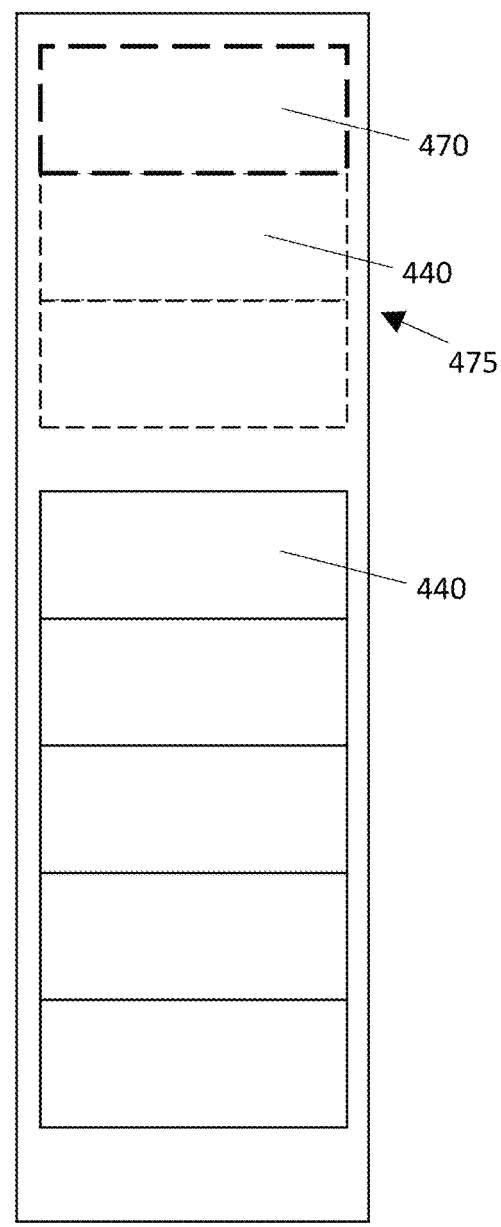
*Fig. 7A*  *Fig. 7B*

US 12,190,041 B2

PORTAL AND INTERFACE SYSTEM AND METHOD

RELATED APPLICATIONS

This application claims the benefit of U.S. Provisional Patent Application No. 63/235,829 filed Aug. 23, 2021, U.S. Provisional Patent Application No. 63/235,839 filed Aug. 23, 2021, and U.S. Provisional Patent Application No. 63/235,845 filed Aug. 23, 2021, each of which is hereby incorporated by reference in its entirety.

FIELD OF THE INVENTION

The present disclosure generally relates to a portal system and method, and more particularly to a portal and interface system and method.

BACKGROUND OF THE INVENTION

Conventional employee and employer search websites typically act as both search engines and databases for open jobs. Some conventional systems offer premium services for job seekers such as career coaching and cover letter writing services. Job sites can help candidates having varying education and experience levels find employment in various sectors. Those candidates actively searching for a job may benefit by using an employee and employer search website in order to find and apply for many relevant opportunities. Also, many recruiters actively use employee and employer search websites to find potential employee candidates for employers.

Many employee and employer search websites are free to browse. A job seeker may type in a desired job title and other search information to search for opportunities that fit the entered search criteria. Some employee and employer search websites involve upfront payments to unlock full browsing and application privileges. Some employee and employer search websites allow employers to reach out to qualified candidates, whether or not the candidates have applied for an open position with the employer.

The conventional employee and employer search websites discussed above have various deficiencies. Conventional designs do not provide for an ability to understand a wide breadth of a potential hire or an ability for a user to understand a work environment or interworking of a company before accepting a position. Accordingly, a need in the art exists for providing these abilities and attributes.

The exemplary disclosed system and method are directed to overcoming one or more of the shortcomings set forth above and/or other deficiencies in existing technology.

SUMMARY OF THE INVENTION

In one exemplary aspect, the present disclosure is directed to a system. The system includes one or more user devices each configured to display a graphical user interface, an update module configured to communicate with the one or more user devices, the update module comprising computer-executable code stored in non-volatile memory, and a processor. The one or more user devices, the update module, and the processor are configured to display the graphical user interface to a user, the graphical user interface displaying a plurality of blocks of content describing the user, receive a content update from the user, associate the content update with at least one of the plurality of blocks of content, and move the at least one of the plurality of blocks to an update position of the graphical user interface.

In another aspect, the present disclosure is directed to a method. The method includes displaying a first graphical user interface to a first user via a first user device, the first graphical user interface displaying a first plurality of blocks of content describing the first user, receiving a content update from the first user, associating the content update with at least one of the first plurality of blocks of content, moving the at least one of the first plurality of blocks to an update position of the first graphical user interface, and displaying a second graphical user interface to a second user via a second user device, the second graphical user interface displaying a second plurality of blocks of content describing the first user.

BRIEF DESCRIPTION OF THE DRAWINGS

FIG. 7A is a schematic illustration of an exemplary user interface of the present invention;

FIG. 7B is a schematic illustration of an exemplary user interface of the present invention;

DETAILED DESCRIPTION AND INDUSTRIAL APPLICABILITY

Figure 1:
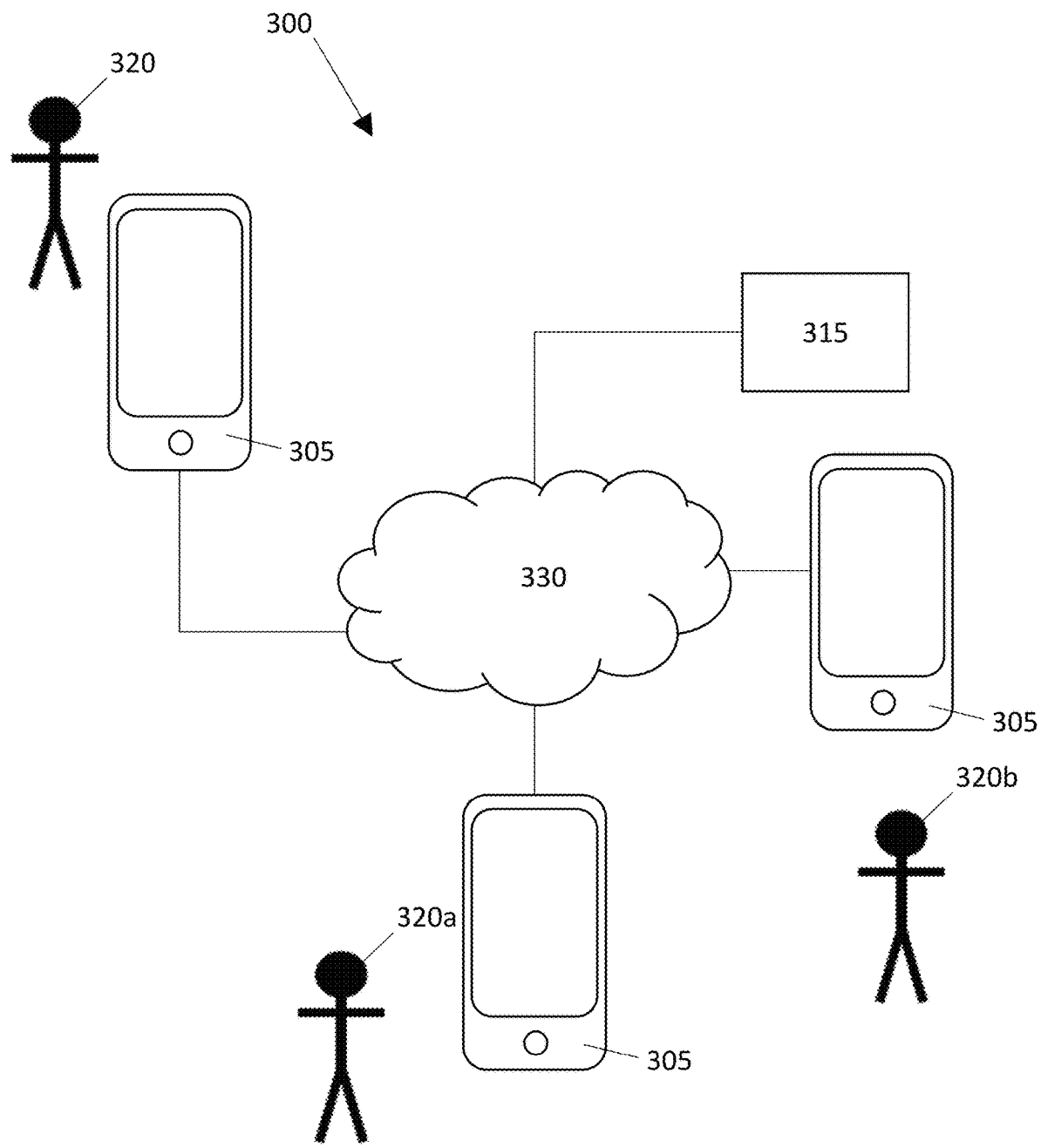
FIG. 1 is a schematic illustration of an exemplary system of the present invention.

FIG. 1 illustrates an exemplary system 300 that may be a portal and interface system. The exemplary disclosed system and method may be a job search and resume web portal system and method. For example, the exemplary disclosed system and method may be an online-based portal and interface for job search and employer search services.

As illustrated in FIG. 1, system 300 may include one or more user devices 305, an update module such as a module 315, and a network 330. Data may be transferred between user devices 305 and module 315 via network 330.

As illustrated in FIG. 1, system 300 may include any desired number of user devices 305. User device 305 may be any suitable device for interfacing with other components of system 300 such as a computing device (e.g., user interface). For example, user device 305 may be any suitable user interface for receiving input and/or providing output (e.g., image data) to a user (e.g., user 320, 320*a*, or 320*b*). For example, each user device 305 may be associated with a given user 320 (e.g., one or more users 320, 320a, or 320b). User device 305 may be, for example, a touchscreen device (e.g., of a smartphone, a tablet, a computer, a smartboard, a virtual reality device, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 9 and 10). For example, user device 305 may include a touchscreen device of a smartphone or handheld tablet. For example, user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on user device 305 and utilized by a user (e.g., user 320, 320a, and/or 320b). User device 305 may include storage for example as described regarding FIG. 9. For example, user device 305 may have storage for storing programming instructions for example as described below. User device 305 may include a GPS device, a Galileo device, a GLONASS device, an IRNSS device, a BeiDou device, and/or any other suitable device that may operate with a global navigation system.

Network 330 may be any suitable communication network over which data may be transferred between one or more user devices 305 and module 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 10. User devices 305 and module 315 may include and/or may be associated with any suitable communication components for communicating with other components of system 300 using for example the communication techniques described above.

In at least some exemplary embodiments, the exemplary disclosed components of system 300 may communicate via any suitable long distance and/or short distance communication technique (e.g., via WiFi, Bluetooth, ZigBee, NFC, IrDA, and/or any other suitable short distance technique). For example, components of system 300 may communicate via long and/or short distance wireless communication.

System 300 may include one or modules 315 for performing the exemplary disclosed operations. Module 315 may be an update module. The one or more modules may be stored and operated by any suitable components of system 300 (e.g., including processor components) such as, for example, network 330, user device 305, and/or any other suitable component of system 300 (e.g., or component external to system 300). For example, system 300 may include one or more modules having computer-executable code stored in non-volatile memory. System 300 may also include one or more storages (e.g., buffer storages) that may include components similar to the exemplary disclosed computing device and network components described below regarding FIGS. 9 and 10. For example, the exemplary disclosed buffer storage may include components similar to the exemplary storage medium and RAM described below regarding FIG. 9. The exemplary disclosed buffer storage may be implemented in software and/or a fixed memory location in hardware of system 300. The exemplary disclosed buffer storage (e.g., a data buffer) may store data temporarily during an operation of system 300.

Figures 2A, 2B:
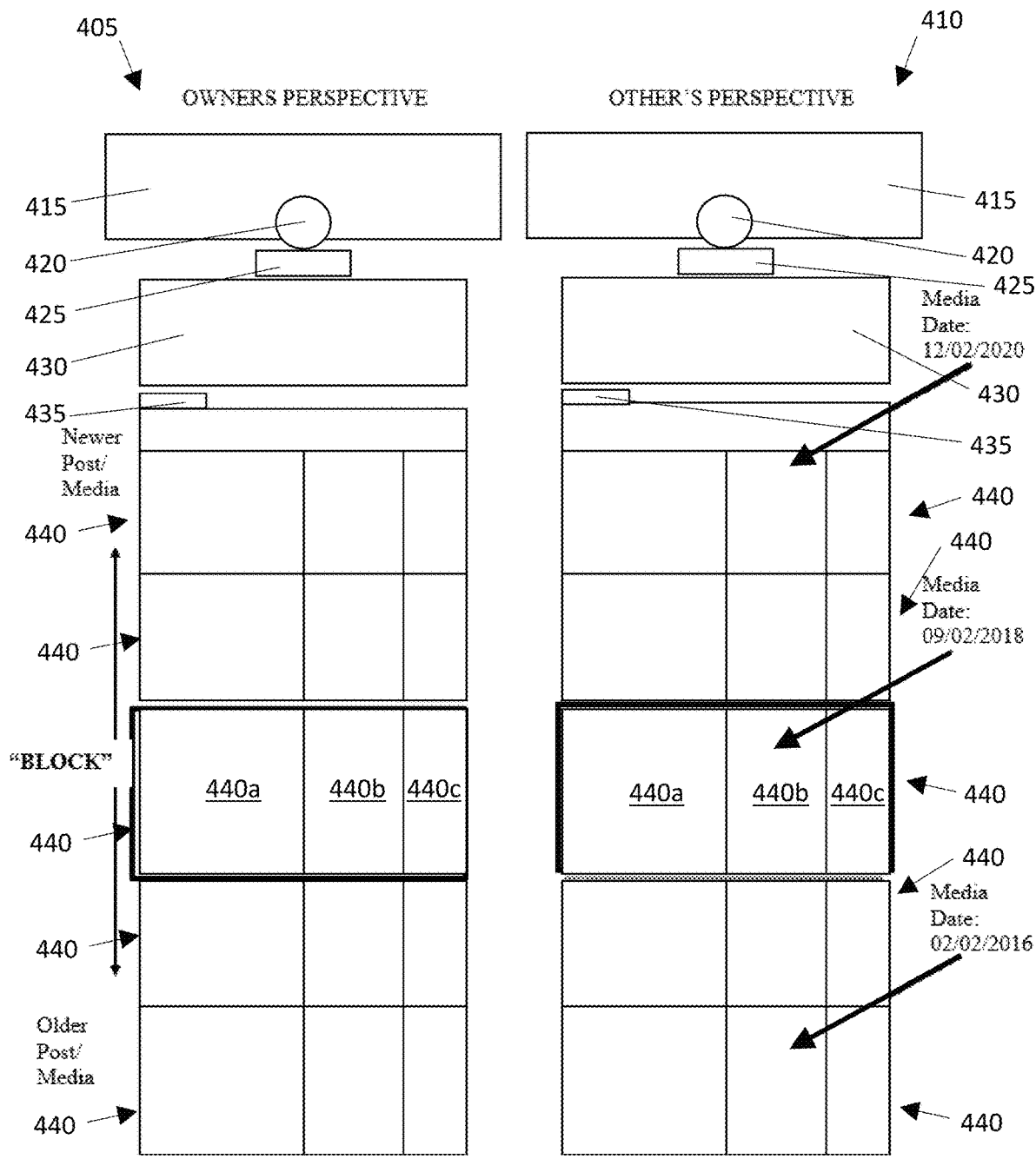
FIG. 2A is a schematic illustration of an exemplary user interface of the present invention.
FIG. 2B is a schematic illustration of an exemplary user interface of the present invention.

FIGS. 2A and 2B illustrate exemplary embodiments of graphical user interfaces (GUI) including graphical elements that may be displayed to a user (e.g., user 320, 320a, or 320b) via user device 305. FIG. 2A illustrates a GUI 405 that may be displayed to first user 320a of system 300 such as an owner that may be associated with data of GUI 405. GUI 405 may display information describing the owner (e.g., user 320a) for example as described below. GUI 410 may also display information associated with user 320a that may be an owner, and may display the information associated with the owner to another user (e.g., a second user 320b that is another user, other than the owner of the information). For example, first user 320a may view that user's own information via GUI 405 displayed via user device 305 of first user 320a, and second user 320b who may be another user other than the data owner (e.g., other than first user 320a) may view the information of first user 320a via GUI 410 via user device 305 of second user 320b. Any user of system 300 may be an owner and a user other than the owner depending on the information displayed (e.g., if the displayed information is owned by a given user, that viewing user may be the owner viewing GUI 405; if the displayed information is owned by another user, then the viewing user may be another user viewing GUI 410). GUI 405 and/or GUI 410 may include generally similar elements for example as described herein that may be displayed in different ways depending on whether the viewing user owns the data (e.g., GUI 405) or does not own the data (e.g., GUI 410). For example, some data may be displayed or not displayed (e.g., and/or displayed differently) depending on whether the viewer is an owner or not an owner. Users such as user 320, 320a, and 320b may be individuals, companies, organizations, and/or any other desired entity.

As illustrated for example in FIGS. 2A and 2B, the exemplary disclosed GUI (e.g., GUI 405 and/or GUI 410) may include a plurality of graphical elements including elements 415, 420, 425, 430, and 435, and a plurality of blocks 440. Elements 415, 420, 425, 430, and 435 and blocks 440 may include any desired information regarding a user (e.g., a first user 420a) such as text, images, hyperlinks, and/or any other desired graphical elements for example as described herein.

For example, element 415 may include a personalized graphic or image and elements for controlling a function of the GUI such as buttons and pull-downs. Element 420 may include an image of a user (e.g., first user 320a such as an individual image and/or an entity image such as a company logo or location) and element 425 may be a name of the user (e.g., first user 320a).

Also for example, element 430 may include any desired information of a user such as user location, number of user connections on system 300 (e.g., other users of system 300), number of subscribing users (e.g., other users of system 300), where the user was born (e.g., is from or was incorporated), nations in which the user is authorized to work and/or registered or licensed, location the user was raised or grew up, languages spoken by the user, distance and/or commute time the user is willing to travel for work, transportation used by user (e.g., driving or train), whether the user is available for remote or in-person activities, and/or any other desired attributes. Element 430 may also display a written description of the user (e.g., bio or summary provided by the user). Element 435 may provide for adding information (e.g., elements and/or blocks 440).

Block 440 may provide a subset of information (e.g., data) regarding a user (e.g., first user 320*a*). Block 440 may include a block of bundled information. Block 440 may include any desired media, comments, and feedback (e.g., from other users). For example, block 440 may be a topic, department, company block, activity block, hobby block, and/or any other desired subset of information. For example, block 440 may be a block of information involving a current job of the user, a previous job of the user, an ability of the user, a hobby or interest of the user, a school attended by the user, a volunteer activity by the user, a favorite place to visit of the user, a favorite sports team (e.g., or festival) visited by the user, and/or any other desired topic. For example, block 440 may include information describing a job, a hobby, an activity, an accomplishment, an internship, education, a job, a certificate, a license, a professional affiliation, veteran status or military awards, a recommendation, volunteer work, a cause favored by the user, any desired affiliation (e.g., professional, charitable, or political), a donation, an endorsement, and/or any other desired topic. Block 440 may include any desired resume information and/or skills.

Block 440 may include any desired media such as information or data (e.g., referenced herein as media) such as photos, video, audio, infographics, pdf memes, product reviews, user-generated content, lists, live video, how-to guides, live chats, link pages, case studies, Q&A, case studies, user posts, newsletters, interviews, embedded tweets, research and data, gifs, eBooks, digital events, illustrations, spreadsheets or docs, podcasts, slideshow or slide shares, online games, news, timelines, interactive products, online tools, webinars, blog posts, personal opinions, digital magazines, maps, stories, quizzes, screenshots, mind maps, quotes, inspirational messages, polls, and/or any other desired information.

Figure 3:
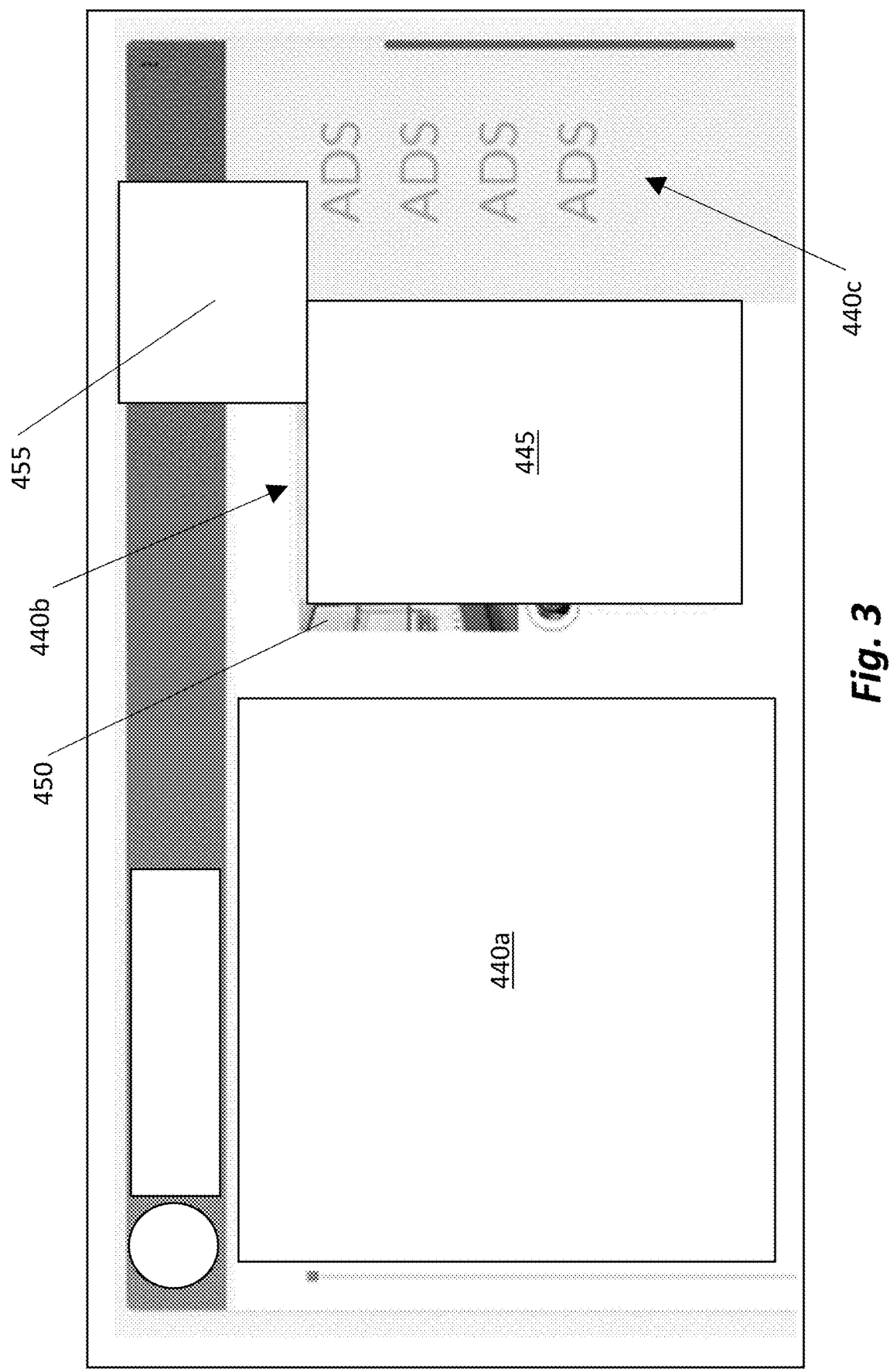
FIG. 3 is a schematic illustration of an exemplary user interface of the present invention.

FIGS. 2A, 2B, and 3 illustrate exemplary embodiments of blocks 440. Block 440 may for example include a block element 440*a*, a block element 440*b*, and a block element 440*c*, which may include any suitable information for example as described herein. In at least some exemplary embodiments, block element 440*a* may include text, table, chart, and/or other descriptive information that may describe block 440. Block element 440*b* may include image, gif, video, audio, and/or any other desired data. Block element 440*b* may also include an element 445 that may include comments of users (e.g., scrollable comments) that may be displayed over (e.g., pop-up over) an element 450 (e.g., a portion of block 440) that may display exemplary disclosed data such as images and videos. Block 440 may also include element 455 that may be a pop-up including any desired information or buttons such as categories and links to other content of the exemplary disclosed GUI and system. Blocks 440 and/or the exemplary disclosed GUI may include any desired scroll bars for dynamically viewing displayed content.

Block element 440*c* may include advertising information and/or any other desired information to be displayed to a user. For example, block element 440*c* may include advertising content that may include any desired information for example as described herein and may be displayed based on paid advertisers utilizing system 300. System 300 may operate to display advertising information based on content displayed in that given block 440. For example, if a block 440 involves weightlifting, system 300 may operate to display advertisements related to weightlifting such as weightlifting equipment and gym memberships. System 300 may utilize the exemplary disclosed artificial intelligence operations, algorithms, and/or any other suitable techniques in displaying data to users in block element 440*c* based on information of block 440 of that block element 440*c*. Advertising may also be displayed in block 440*c* that may be unrelated to the content of block 440 of that block element 440*c*.

The exemplary disclosed GUIs and blocks may be displayed having any desired arrangement or configuration. For example, the information of block elements 440*a*, 440*b*, and 440*c* may be displayed in any desired relative location or position (e.g., any of the block elements may be disposed above, below, or to the side of other block elements). The exemplary disclosed elements of the exemplary disclosed GUIs illustrated in FIGS. 2A and 2B may be similarly disposed in any desired arrangement or configuration relative to each other.

The exemplary disclosed blocks may be populated by user input by a given owning user (e.g., user 320*a*) and/or any users of system 300. For example, information provided by a given user regarding a given topic may be displayed to other users viewing that topic (e.g., regarding a given company). For example, a review of a company posted by first user 320*a* in a given block 440 may be displayed to second user 320*b* in block 440 regarding that same company. Information may thereby be shared between users of system 300 and used in populating blocks 440 of GUIs for some or all users.

Figure 4:
FIG. 4 is a schematic illustration of an exemplary user interface of the present invention.

FIG. 4 illustrates another exemplary embodiment of the exemplary disclosed block. For example, video and/or image data may be displayed with any desired arrangement of advertisements in any desired order.

Figure 5:
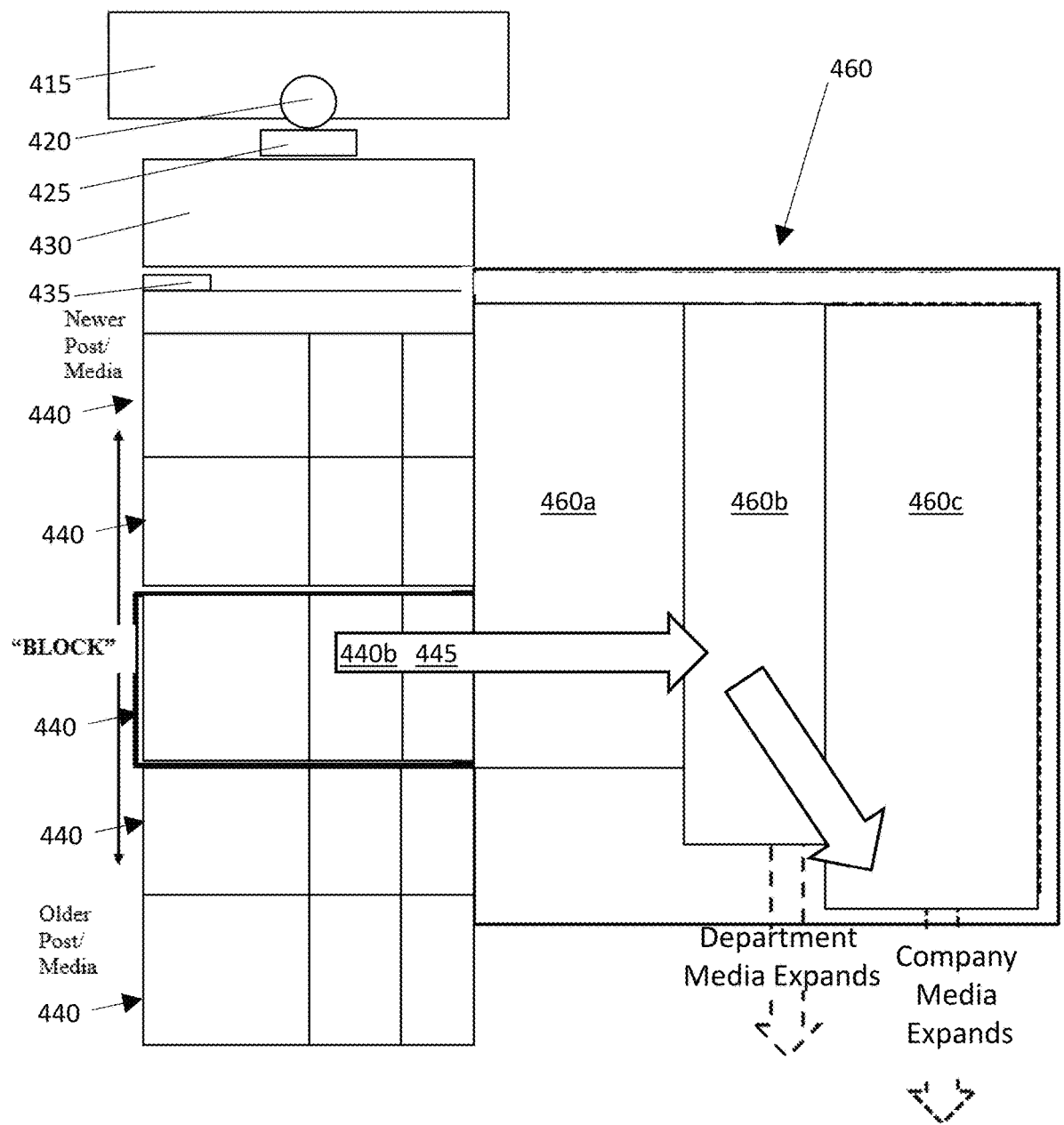
FIG. 5 is a schematic illustration of an exemplary user interface of the present invention.

FIG. 5 illustrates an exemplary dynamic action of a user's given block 440 within the GUI 405 and/or GUI 410 for displaying/viewing a posting 460. For example, media within block 440 may include an element that may be displayed respectively on a separate posting 460. By adding elements within block 440, a same element may be displayed/viewable on a separate posting 460. The posting 460 may be for a job, a classified advertisement (e.g., seeking a roommate, selling an item, or any other desired posting), an offer (e.g., an item for sale, a desired item, a desired service, or any other desired offer), and/or any other activity or action of interest. The media within a block of GUI 405 may be displayed/viewable on posting 460 (e.g., a separate display page). The media displayed/viewable in element 460*b* may be a sum of all media posted and related to a company department, personal subject, hobby, etc. The media displayed in element 460*c* may be a sum of all media posted to the related company or person. Elements 460*a*, 460*b*, and/or 460*c* may include scrolls and/or any other suitable elements for dynamically viewing the content of expanded posting 460. Element 460*a* may include a post description including text, tables, images, and/or other desired information describing the posting. For example, element 460*a* may include job posting information and/or any other desired information associated with the exemplary disclosed postings described above. Element 460*b* may display media of block 440. One or more elements of the posting may include information of a poster (e.g., posting user) of the exemplary disclosed post (e.g., a company posting a job). The element 445 (e.g., including comments) within block 440 may also be displayed beside or on top of block element 440b displayed in element 460b or element 460c.

Figure 6A:
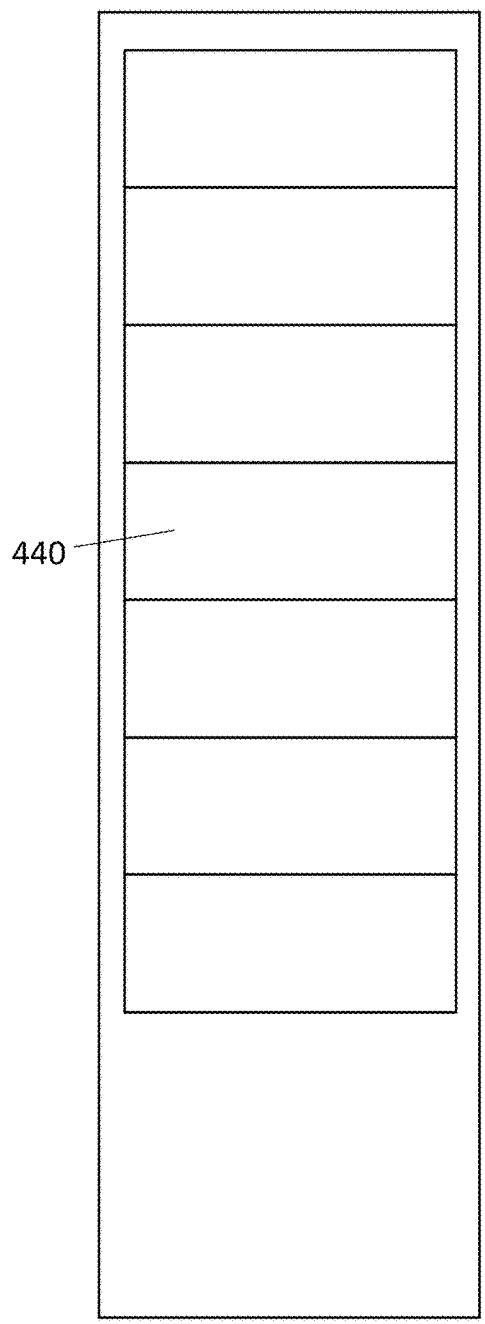
FIG. 6A is a schematic illustration of an exemplary user interface of the present invention.
Figure 6B:
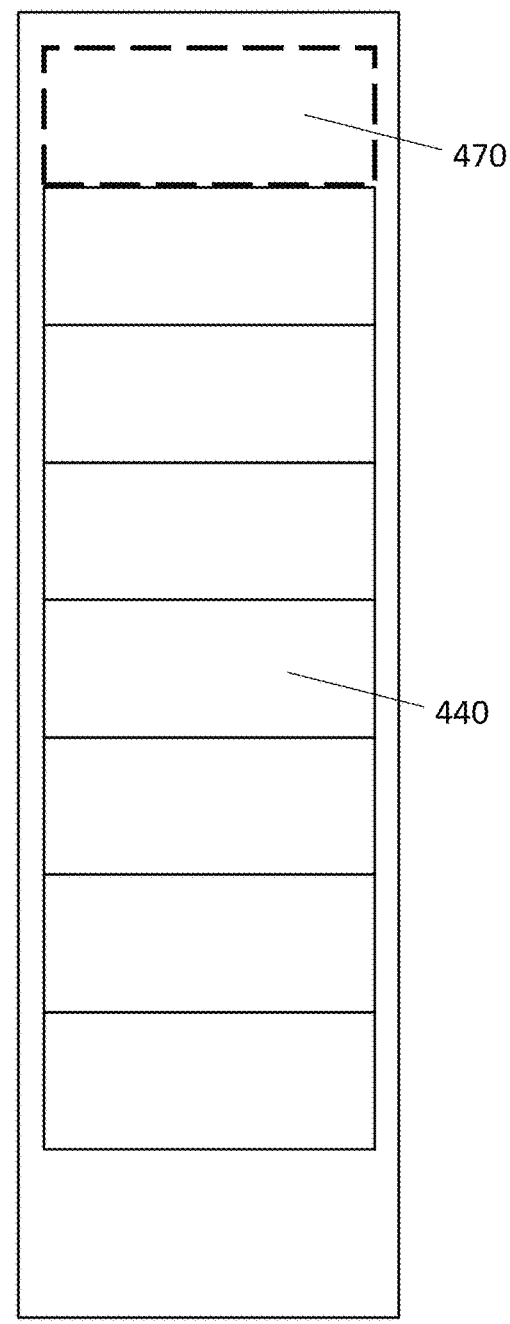
FIG. 6B is a schematic illustration of an exemplary user interface of the present invention.

FIGS. 6A and 6B (e.g., and 7A and 7B) schematically illustrate exemplary postings of a new block by a user (e.g., user 320a) such as an owner of information. In at least some exemplary embodiments, a block may be added, and the block may be disposed (e.g., go) anywhere. The block location may be dependent of when (e.g., a time) the block content (e.g., media) is added. The block may be in any desired location of the GUI when it is blank, includes a small or any amount of data, or when content such as text is edited. The block may move to an update position (e.g., the top) based on when media of that block (e.g., said topic) is added. For example, the block including the most recent (e.g., most recently added) media may move to an update position (e.g., the top) of the GUI. FIGS. 6A, 6B, 7A, and 7B illustrate exemplary embodiments of the exemplary disclosed system and method. FIGS. 6A and 7A schematically illustrate an exemplary disclosed GUI prior to posting of a newly posted block 470, and FIGS. 6B and 7B schematically illustrate the exemplary disclosed GUI after posting of newly posted block 470. The user may post the block using any suitable input entry template or element that may be for example a blank block 440 that may be filled in by the user using the GUI (e.g., based on activating element 435) or an existing block 440 that may be edited using the GUI. After entering or editing information for newly posted block 470 that may be a new block or a newly edited block, and then posting block 470, block 470 may move to an "update position" such as a newly edited position (e.g., a top of the GUI or any other desired position). For example, newly posted block 470 may move to the top of the GUI. As illustrated in FIGS. 7A and 7B, a section 475 of information of which block 470 may be a part of may also move to the top of the GUI. For example, newly posted data blocks may move to the top of the GUI, as well as larger sections of data of which the newly posted block may be a part. For example, newly posted block 470 that may be a school may move to the top of section 475 that may be education, and the entire section 475 may move to the top of the GUI (e.g., so that newly posted block 470 may move to the top of section 475, and section 475 may move to the top of the GUI). Alternatively for example, a given section 475 may remain stationary on the GUI, with newly posted block 470 moving to a top of that section. Also for example as illustrated in FIGS. 6A and 6B, newly posted block 470 may move to the top of a GUI including a plurality of blocks 440. Based on successive exemplary disclosed sorting, relatively newer block postings may be sorted toward an update position such as a new location (e.g., top) of the GUI, while older block postings may move toward an old location (e.g., bottom) of the GUI (e.g., move away from the update position). In at least some exemplary embodiments, the exemplary disclosed GUI may include a plurality of blocks 440 that may be sorted from newest to oldest by date of posting (e.g., new posting and/or new editing). In at least some exemplary embodiments, block 440 may move when media is added to the block.

In at least some exemplary embodiments, users (e.g., individuals and/or companies) may view their own data (e.g., via GUI 405) to discern blocks (e.g., topics such as activities, hobbies, jobs, education, and/or other exemplary disclosed blocks) that they have recently engaged in (e.g., or not engaged in). For example based on viewing the exemplary disclosed GUI, users may discern or identify topics (e.g., described by blocks 440) in which they have not engaged for a relatively long time. For example, user may determine that they have not engaged in (e.g., neglected) a given topic for a relatively long time and that it may be suitable to again engage in that topic (e.g., block 440).

In at least some exemplary embodiments, the exemplary disclosed system and method may provide a platform for users to post their resumes and connect with employers. The exemplary disclosed system and method may include a professional and sophisticated live social network having tools for showing a person's true work value, beyond resume information. For example, system 300 may provide functionality for organizing work history (e.g., showing what people have done and where they are capable of doing). System 300 may display a potential employee's resume in a chronological and/or interactive format. In at least some exemplary embodiments, a user (e.g., an employee) may build a resume with an intention of not deleting any part of it. The user (e.g., user 320a) may display accomplishments, and system 300 may operate to verify diplomas, certificates, licenses, and any other desired information. System 300 may allow users to grow their network (e.g., via J-tagging or J#). System 300 may provide a secure and verified network. System 300 may provide users such as employers with in-depth information, including for example a "real story" of who a potential employee "really" is and that employee's true and verifiable capabilities. Also for example, system 300 may provide users such as potential employees with a "real story" of what a potential employer "really" is and the employer's true and verifiable work environment and/or contributions to the world.

In at least some exemplary embodiments, the exemplary disclosed system and method may help employers understand a personality, goals, likes, and/or dislikes of a potential employee. The exemplary disclosed system and method may provide potential employees with a sense of what actually working at a company may be like, beyond self-reporting of the company such as content of public relations statements. For example, information regarding a "real" personality of a company including office environment and company culture may be provided to users from actual employees (e.g., also users 320 of system 300) about the real inner affairs of the company, work environment, culture, activities, and/or any other suitable information. Such information may accurately display actual employee life, work, hobbies, activities, accomplishments, education, internships, education, jobs (e.g., previous jobs), certificates, recommendations, volunteerism, causes, affiliations, donations, endorsements, personality, likes, dislikes, and/or any other desired information such as for example as described herein.

In at least some exemplary embodiments, the exemplary disclosed system and method may operate to maintain (e.g., never delete and/or encourage users not to delete) some or all parts of a user's resume and other information. User information may thereby provide a continuous showcase (e.g., a continuum) of a person's life (e.g., even as far back as a first job, hobby, activity, accomplishment, education, internship, education, certificate, recommendation, volunteerism, cause, affiliation, donation, endorsement, personality, likes, dislikes, and/or any other desired information). Using such information, users such as employers may discern a "real" potential employee, discern what makes a potential employee tick, and/or what motivates the employee. An employee may become a virtual ambassador for a company or companies at which they work or worked, as the user may be able to provide (e.g., post to system 300)

various media, pictures, text, and other information showing what it is like to work at the company.

In at least some exemplary embodiments, the exemplary disclosed system and method may operate to allow some or all users to be an employer for themselves or a company for which they work. For example, if a user is searching for a babysitter, system 300 may identify users that babysit (e.g., based on search terms or other suitable criteria). Also for example, users such as employees may search to find other users such as employees that would mow a lawn or perform landscaping (e.g., or find a vice president for their corporate office).

In at least some exemplary embodiments, a user who works for a company may utilize system 300 to search, vet, and/or hire someone for a company not owned by the user, with system 300 allowing a user to pay another user (e.g., who may act as an employee or contractor) through the use of a token. For example, a digital token (e.g., a code) may be associated with (e.g., tied to) a company payment method, which may securely allow a user who works for that company to pay an employee or contractor for services provided to said company without the paying user knowing the company's banking information. System 300 may allow users to pay for hires directly via a company payment method (e.g., or a user payment method) and/or allow users to conduct payroll for employees and/or contractors that they oversee while making payments via the company payment method.

In at least some exemplary embodiments, based on employees providing the exemplary disclosed information to system 300 (e.g., on a website or platform), a skill or activity (e.g., a hobby) that an employee shares on the platform may be turned into a job offer by another user. For example, a user may message another user regarding a skill or activity (e.g., "I love your paintings, and I saw them on the website. Can you paint something for me?" or "You inspired me to work out, and I see you live in my town. Can I pay you for personal training at the local gym?").

In at least some exemplary embodiments, posts that employees share about work may become publicity (e.g., overnight marketing) for a company. Users who work for a company may be proud of their company and may want to share their experiences regarding the company. For example, users may spend significant time at work, and may wish to share their contributions.

In at least some exemplary embodiments, a user who may be looking for a new job may come across a job post where the user can see photos and videos of a particular department, the company atmosphere, the company energy, the company team, and/or the work. From seeing this more in-depth information using system 300, users such as potential employees may desire to work at that company (e.g., see themselves working there).

Although employers may indicate that company benefits are what attracts employees to the company, employees may not find out what the "real" benefits are for a couple weeks into a job. In at least some exemplary embodiments, system 300 may provide such information. System 300 may also provide pay or pay-range data for potential employees to view based on current employee information. System 300 may operate to illustrate (e.g., not allow and/or encourage users not to hide) a work environment, worker morale, benefits, pay, and/or other features. Such information may become transparent for both prospective employees and prospective employers utilizing system 300.

In at least some exemplary embodiments, newly provided information (e.g., recent and/or the most recent media that is posted) to system 300 by a given user 320*a* may cause information (e.g., resume content for a given company, department, topic, or title area) to which the newly provided information may be tied to move to an update position such as a top of a page, a beginning of a page, a more readily accessible portion on a page, and/or to any other desired portion of the exemplary disclosed GUI for newly posted information.

In at least some exemplary embodiments, system 300 may include resume text block areas (e.g., blocks 440) that may move depending on when (e.g., date and/or time) a post (text, image, media, digital, and/or any other desired information) is posted. Information (e.g., of block 440) may be associated with (e.g., tied to) a block (e.g., block 440) and/or section 475. For example, information may be associated with or tied to a given company, department, topic or title of the exemplary disclosed GUI (e.g., of a resume or profile page of a user). The information may be associated or tied with other information based on user input, algorithm, artificial intelligence operations, and/or any other suitable operation of system 300.

In at least some exemplary embodiments, the exemplary disclosed GUI (e.g., including information of a user) may be dynamic and the content (e.g., text) of various topic areas may move based on when the media it is tied to is posted (e.g., newly posted information and blocks and/or sections with which it is associated may move). Such movement may maintain areas in which a user is actively engaged (e.g., related to a company, user's self, department, hobby, and/or various topic areas) at a top of a GUI (e.g., page) and/or first to be viewed upon a user returning to system 300. As information (e.g., posts) including media uploads become older, such information (e.g., related to a company, user's self, department, hobby, and/or various topic areas) may fall lower and/or be less readily accessible on a GUI (e.g., webpage). As an illustrative example, if a user lifeguarded when that user was younger and posted a picture tied to that resume area block (e.g., block 440 including for example: Company: City of Los Angeles, Department: Waterfront, Title: lifeguard), and it has been 10 years since the user posted pictures of this job, then this block may be disposed toward the bottom of the exemplary disclosed GUI (e.g., website or application) if newer information was made thereafter. If the user posts a picture (e.g., media) today of a reunion party that was tied to this block (e.g., Company: City of Los Angeles, Department: Waterfront, Title: lifeguard), then this block (Company: City of Los Angeles, Department: Waterfront, Title: lifeguard) and/or section of which this block is a part would move up to a top or most accessible area of the exemplary disclosed GUI until more recent posts are subsequently made.

In at least some exemplary embodiments, system 300 may provide for resume arrangement of blocks of bundled information. Information (e.g., media) within a given block 440 may be tied by the user (e.g., and/or system 300) to that block. The feedback in that block provided by other users of system 300 may be included in data tied to the media of user posts, which may also be tied to that block. An advertisement area within that block may include ads or content relating to that block.

In at least some exemplary embodiments, blocks, groups of blocks, and/or sections of related information (e.g., related to a given block) may move dynamically within the exemplary disclosed GUI when information (e.g., media) is added and/or updated to that given block. The given block may be arranged so that a topic (e.g., block, group of blocks, and/or section) including media added most recently may move to an update position (e.g., a top of a page or able to be viewed first). If a block did not have any recent media added within the block, the block may drop down on a list and/or be viewed later. Users may manually rearrange or filter blocks after newly posted information moves to the top, if desired, as part of the exemplary disclosed system and method.

In at least some exemplary embodiments, system 300 may provide for some or all posts (e.g., information and/or media) that may be tied to another user's block (e.g., a company) to be displayed on a posting user's page and on the department (e.g., company) job post pages. Also for example, origination of information and/or media may be from a user's online resume. A user (e.g., a viewer such as user 320b) may have an ability to save advertisements and/or links shown to the user (e.g., while a video is playing) to view later. For example, these may be topics and/or products that the user may be interested in, but the user does not want to interrupt the video the user is watching.

In at least some exemplary embodiments, when a user desires to monetize content (e.g., a video), the user may indicate specific metadata at specific time slots of the video where relevant ads may populate outside of or on top of the viewing window in the exemplary disclosed GUI. For example, a personal trainer may be discussing weight belts at 1 min 53 sec of a video and weight belt ads may be displayed at that time or at a time thereafter. The metadata assigned at the time noted may be "weight belts" or any other desired metadata. The user may also be more specific and may indicate a specific brand of weight belt inside the metadata field for that specific time.

In at least some exemplary embodiments, some or all information (e.g., posted information and/or media) may be tied to a given block (e.g., block 440) of the exemplary disclosed GUI. System 300 may include video advertising (e.g., inserting advertisements within and/or near a video for monetization), in which advertisements may be stored and/or displayed in a separate area of the exemplary disclosed GUI than the video itself. For example, a user 320a may be a gym personal trainer who posts videos of workouts and who would like to monetize the videos, but would not like to have videos displayed on their profile to be interrupted with a commercial (e.g., and/or distract from the professional appearance of their information). A viewing user 320b may see advertisements displayed outside the video perimeter and/or stored in an advertisements area to review later.

As an illustrative example, a user (e.g., user 320a) may post a video within the user's resume. The posted video may include metadata. Other users (e.g., companies) may provide payment to system 300 for their company ads to be strategically displayed at a desired time when a viewing user (e.g., user 320b) is watching a video (e.g., utilizing pay-per-click and/or pay-per-impression), for example based on metadata being provided at a specific point within the video that may be relevant to the advertising content. Advertisements may be placed at various time intervals during playing of the video. Users (e.g., user 320a) may be paid based on a number of times their videos are viewed and/or ads are displayed. The viewing user (e.g., user 320b) may be interested in the content of the video shown (e.g., content of user 320a) and may be interested in content of advertisement displayed outside and/or on top of a video viewing area and/or stored in an area of the exemplary disclosed GUI that may be accessed later.

In at least some exemplary embodiments, the exemplary disclosed system and method may include an employer/employee website platform, including server software configured to provide website interface enabling storing of potential employees' continuous work history.

In at least some exemplary embodiments, the exemplary disclosed system and method may include a video advertising system, including server software configured to provide website interface enabling viewing of videos to a user, server software configured to determine advertising information to be displayed to the user, determining the placement location of advertising within the website interface, and server software configured to cause display of the advertising information in a location. For example, various video advertising systems may include server software configured to provide website interface enabling viewing of videos to a user and server software configured to determine advertising information to be displayed to the user. The system may also include server software configured to determine the placement location of advertising within the website interface and server software configured to cause display of the advertising information in a location.

In at least some exemplary embodiments, the exemplary disclosed system and method may include a system and method for payment via digital token, including an ability of a user to conduct payments (e.g., company payroll) via a digital token/code to securely pay employers/contractors who work for the company. For example, the system may include an employer/employee website platform including server software configured to provide a website interface providing for storage of potential employee work history, and server software configured to provide the ability of a user to conduct company payroll via at least one of a digital token or code to securely pay at least one of an employee or a contractor who may work for the company.

In at least some exemplary embodiments, the exemplary disclosed system and method may include a video advertising functionality that may be used in any suitable employee and employer search or matching services. The video advertising service may be hosted with a resume service or separately on any suitable hosting site or third party vendors. The video advertising service may be used with any suitable online service or site where videos may be used for providing information to users and generating revenue.

In at least some exemplary embodiments, the exemplary disclosed system and method may include a system and method for payroll via digital token. The exemplary disclosed system and method may include server software configured to provide a website interface providing for storage of potential employee work history, and server software configured to provide the ability of a user to conduct company payroll via at least one of a digital token or code to securely pay at least one of an employee or a contractor who works for the company.

The exemplary disclosed system and method may be used in any suitable online application. The exemplary disclosed system and method may be used in any suitable application for connecting users such as connecting employers with job candidates. For example, the exemplary disclosed system and method may be used for any suitable employee and employer search websites.

Figure 8:
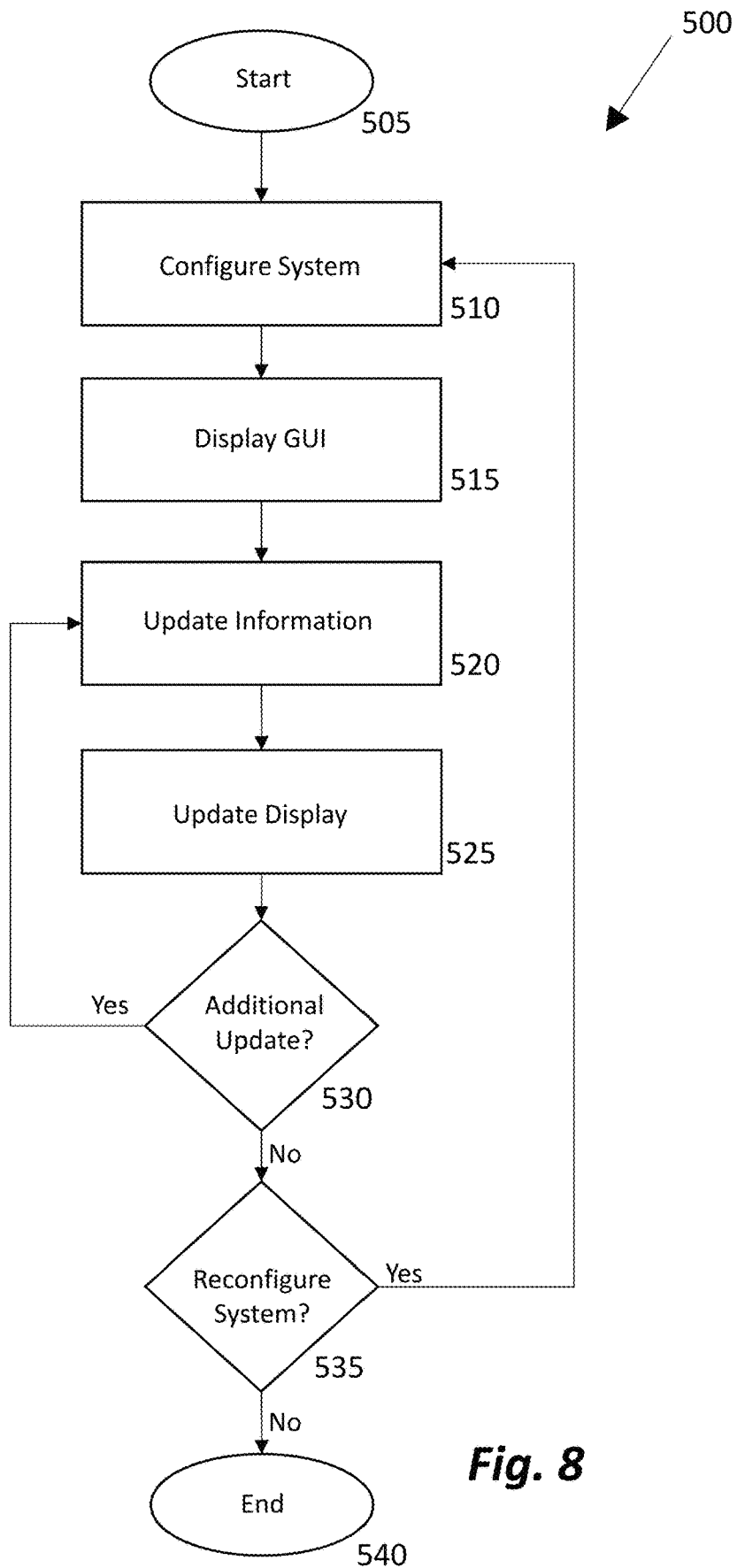
FIG. 8 is a flowchart showing an exemplary process of the present invention.

An exemplary operation of the exemplary disclosed system and method will now be described. For example, FIG. 8 illustrates an exemplary process 500 of system 300. Process 500 begins at step 505.

At step 510, system 300 may be configured. Any desired number and arrangement of user devices 305 may be provided in system 300. The exemplary disclosed user devices may be configured to receive data and signals from other components of system 300 for example as described herein.

The exemplary disclosed module (e.g., module 315), storage (e.g., storage buffer), and hardware may include a memory having stored thereon instructions, a processor configured to execute the instructions resulting in a software application, and a software application configured to perform process 500.

In at least some exemplary embodiments at step 510, users may install an application of system 300 on user devices 305. The users may authorize the application to access the data of Bluetooth or any other suitable communication components of user device 305. The exemplary disclosed user devices may be connected to components of system 300 for example as described herein.

At step 515, system 300 may display the exemplary disclosed GUIs (e.g., GUI 405 and/or 410) via user devices 305 for example as described above. At step 520, a user (e.g., user 320a) may provide information (e.g., a post or an update) to system 300 via user device 305. At step 525, system 300 may update a display of the exemplary disclosed GUI for example as described above regarding FIGS. 6A, 6B, 7A, and 7B. For example, newly posted block 470 and/or section 475 including newly posted block 470 may move to a top, beginning, or other portion of the exemplary disclosed GUI for newly posted information.

At step 530, system 300 may determine whether or not additional and/or edited information has been provided by users (e.g., user 320a). If additional information (e.g., a new or updated post) has been provided, system 300 may return to step 520. System 300 may repeat steps 520 through 530 for any desired number of iterations. If additional information is not to be provided, system 300 may proceed to step 535.

At step 535, system 300 may determine whether or not system 300 is to be reconfigured based on, for example, input provided by user 320, a predetermined operation or algorithm of the exemplary disclosed module, and/or any other suitable criteria. If system 300 is to be reconfigured, system 300 may return to step 510. System 300 may repeat steps 510 through 535 for any desired number of iterations. If system 300 is not to be reconfigured, system 300 may proceed to step 540, at which process 500 ends.

In at least some exemplary embodiments, the exemplary disclosed system may include one or more user devices (e.g., user device 305) each configured to display a graphical user interface, an update module configured to communicate with the one or more user devices, the update module comprising computer-executable code stored in non-volatile memory, and a processor. The one or more user devices, the update module, and the processor may be configured to display the graphical user interface to a user, the graphical user interface displaying a plurality of blocks of content describing the user, receive a content update from the user, associate the content update with at least one of the plurality of blocks of content, and move the at least one of the plurality of blocks to an update position of the graphical user interface. The one or more user devices, the update module, and the processor may be configured to move remaining blocks of the plurality of blocks of content away from the update position. The plurality of blocks may be sorted from newest to oldest by date of updating by the user. The plurality of blocks of content may include information selected from the group of resume information of the user, hobbies of the user, education of the user, and combinations thereof. The plurality of blocks of content may display data selected from the group of a picture, a video, text, advertising content, and combinations thereof. The user may be a first user and the graphical user interface may be a first graphical user interface. The one or more user devices, the update module, and the processor may be configured to display at least some of the information of the plurality of blocks to a second user via a second graphical user interface. The first graphical user interface may display different information to the first user than information of the second graphical user interface displayed to the second user. The first user may be a prospective employee of the second user that may be an employer. The first user may be a prospective contractor or employee of the second user based on a skill of the first user that may be displayed to the second user via the second graphical user interface. A second plurality of blocks of the second graphical user interface may maintain a stationary position when the at least one of the plurality of blocks moves to the update position of the graphical user interface that may be the first graphical user interface.

In at least some exemplary embodiments, the exemplary disclosed method may include displaying a first graphical user interface to a first user via a first user device (e.g., user device 305), the first graphical user interface displaying a first plurality of blocks of content describing the first user, receiving a content update from the first user, associating the content update with at least one of the first plurality of blocks of content, moving the at least one of the first plurality of blocks to an update position of the first graphical user interface, and displaying a second graphical user interface to a second user via a second user device, the second graphical user interface displaying a second plurality of blocks of content describing the first user. The exemplary disclosed method may also include moving remaining blocks of the first plurality of blocks of content away from the update position. The exemplary disclosed method may further include maintaining the second plurality of blocks in a stationary position on the second graphical user interface when moving the at least one of the first plurality of blocks and the remaining blocks of the first plurality of blocks on the first graphical user interface. The exemplary disclosed method may also include maintaining the second plurality of blocks in a stationary position on the second graphical user interface when moving the at least one of the first plurality of blocks on the first graphical user interface. The exemplary disclosed method may further include identifying the first user as a prospective employee, employer, or contractor for the second user based on information displayed in the second plurality of blocks of the second graphical user interface via the second user device. The exemplary disclosed method may also include displaying the first plurality of blocks of the first graphical user interface to the first user via the first user device. The first plurality of blocks may be sorted from newest to oldest by date of updating by the first user. The first plurality of blocks of content may include information selected from the group of resume information of the first user, a hobby of the first user, education of the first user, and combinations thereof. The oldest of the first plurality of blocks may include the hobby of the first user that the first user has neglected over time. The exemplary disclosed method may also include displaying advertising content in the first or second plurality of blocks based on video content being displayed in the first or second plurality of blocks. Moving the at least one of the first plurality of blocks to the update position of the first graphical user interface may include moving the at least one of the first plurality of blocks to the top of a webpage displayed by the first graphical user interface.

In at least some exemplary embodiments, the exemplary disclosed system may include a first user device (e.g., user device 305) configured to display a first graphical user interface to a first user, a second user device configured to display a second graphical user interface to a second user, an update module configured to communicate with the first and second user devices, the update module comprising computer-executable code stored in non-volatile memory, and a processor. The first and second user devices, the update module, and the processor may be configured to display a first plurality of blocks of content describing the first user to the first user via the first graphical user interface, display a second plurality of blocks of content describing the first user to the second user via the second graphical user interface, receive a media update from the first user, associate the media update with at least one of the first plurality of blocks of content and at least one of the second plurality of blocks of content, move the at least one of the first plurality of blocks to an update position of the first graphical user interface when the media update is added to the at least one of the first plurality of blocks, and maintain a position of the at least one of the second plurality of blocks of the second graphical user interface.

The exemplary disclosed system and method may provide an efficient and effective technique for providing an ability to understand a wide breadth of a potential hire and/or an ability for a user to understand a work environment and/or interworking of a company before accepting a position. The exemplary disclosed system and method may also provide a dynamic technique for presenting a significant variety of opportunities for paid work, activities, and/or collaboration between users.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a standalone and on an ensemble basis, and final prediction may be based on the model/structure which delivers the highest degree of accuracy and stability as judged by implementation against the test and validate datasets.

Figure 9:
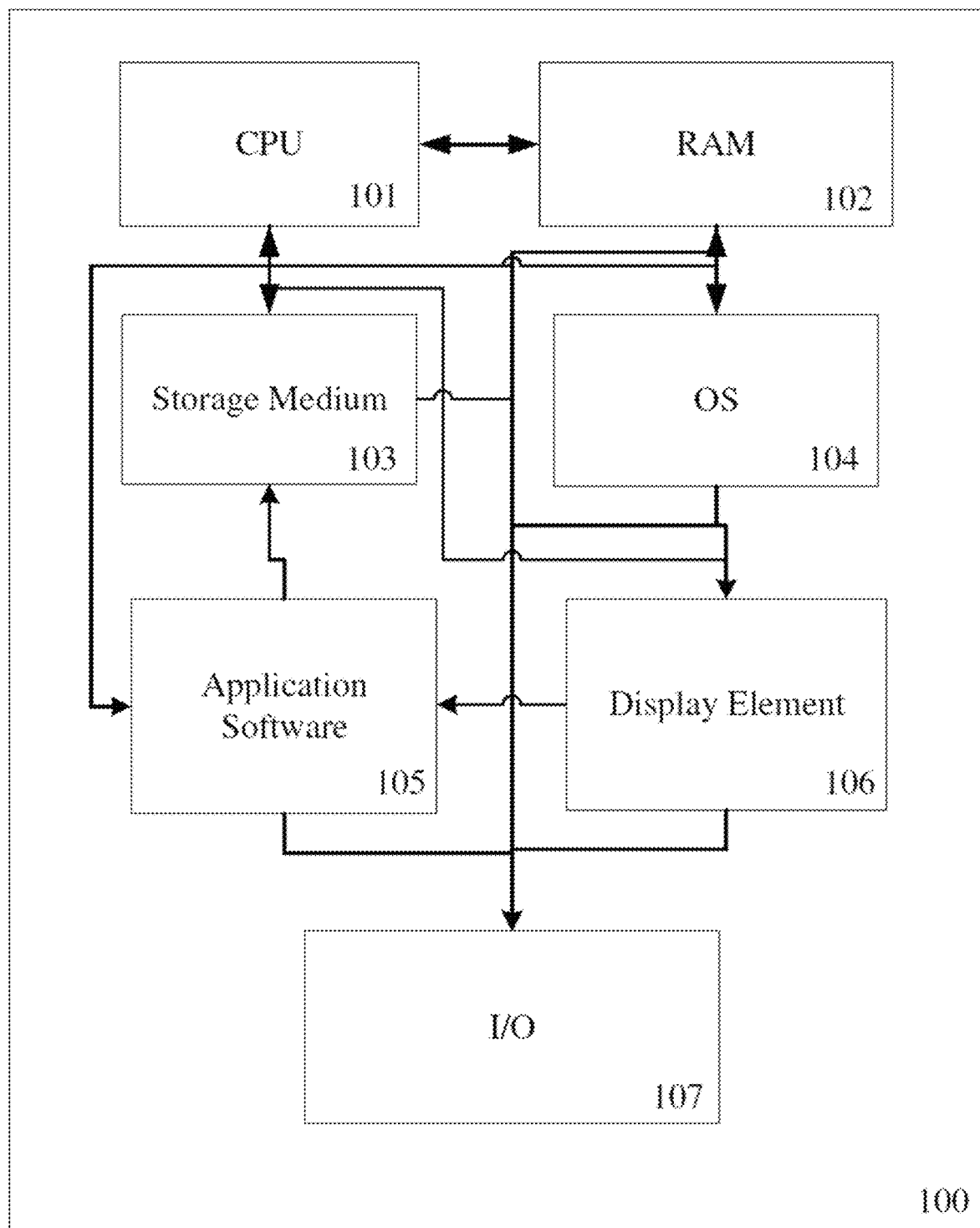
FIG. 9 is a schematic illustration of an exemplary computing device, in accordance with at least some exemplary embodiments of the present disclosure.

An illustrative representation of a computing device appropriate for use with embodiments of the system of the present disclosure is shown in FIG. 9. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 10, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 10:
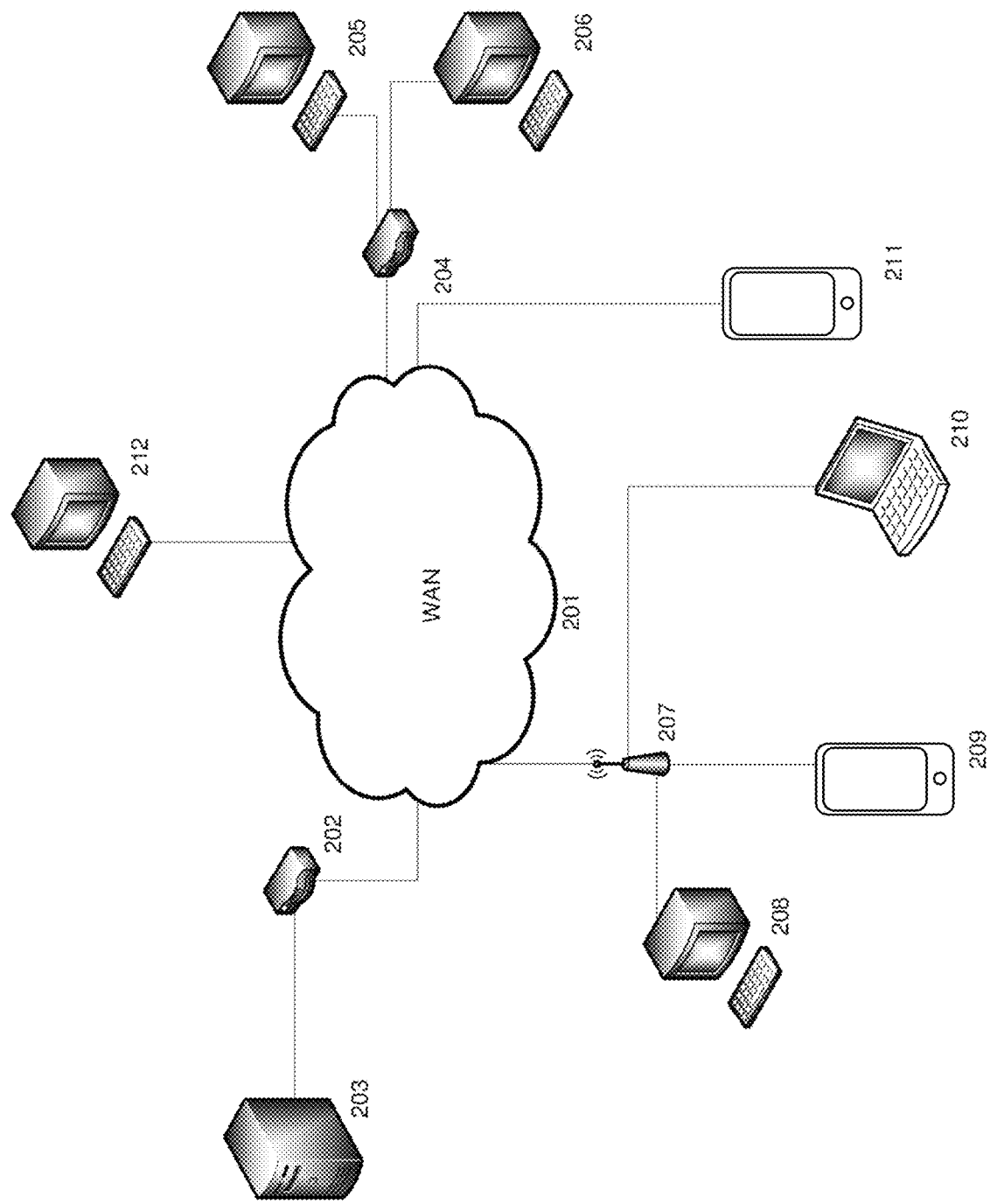
FIG. 10 is a schematic illustration of an exemplary network, in accordance with at least some exemplary embodiments of the present disclosure.

Referring to FIG. 10, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 10, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
    displaying a first graphical user interface to a first user via a first user device, the first graphical user interface displaying a first plurality of blocks of content describing the first user;
    receiving a content update from the first user;
    associating the content update with at least one of the first plurality of blocks of content;
    identifying a first type of media from the first content update;
    moving the at least one of the first plurality of blocks to an update position of the first graphical user interface, based at least in part on the first type of media associated with said content update;
    receiving a second content update from the user;
    identifying a second type of media from the second content update from the user; and
    associating the second content update with at least one of the plurality of blocks of content, wherein based at least in part on the second type of media;
    retaining a second block from the plurality of blocks at a position in the graphical user interface at the original location of the second block;
    displaying a second graphical user interface to a second user via a second user device, the second graphical user interface displaying a second plurality of blocks of content describing the first user;
    moving remaining blocks of the first plurality of blocks of content away from the update position; and
    maintaining the second plurality of blocks in a stationary position on the second graphical user interface when moving the at least one of the first plurality of blocks and the remaining blocks of the first plurality of blocks on the first graphical user interface.

2. The method of claim 1, further comprising maintaining the second plurality of blocks in a stationary position on the second graphical user interface when moving the at least one of the first plurality of blocks on the first graphical user interface.

3. The method of claim 1, further comprising identifying the first user as a prospective employee, employer, or contractor for the second user based on information displayed in the second plurality of blocks of the second graphical user interface via the second user device.

4. The method of claim 1, further comprising displaying the first plurality of blocks of the first graphical user interface to the first user via the first user device, wherein:
    the first plurality of blocks is sorted from newest to oldest by date of updating by the first user; and
    the first plurality of blocks of content includes information selected from the group of resume information of the first user, a hobby of the first user, education of the first user, and combinations thereof.

5. The method of claim 4, wherein the oldest of the first plurality of blocks includes the hobby of the first user that the first user has neglected over time.

6. The method of claim 1, further comprising displaying advertising content in the first or second plurality of blocks based on video content being displayed in the first or second plurality of blocks.

7. The method of claim 1, wherein moving the at least one of the first plurality of blocks to the update position of the first graphical user interface includes moving the at least one of the first plurality of blocks to the top of a webpage displayed by the first graphical user interface.

* * * * *